United States Patent
Farkaly

(10) Patent No.: US 9,222,371 B2
(45) Date of Patent: *Dec. 29, 2015

(54) EFFICIENT HEAT EXCHANGE SYSTEM FOR STORING ENERGY

(76) Inventor: Stephen J. Farkaly, Indianapolis, IN (US)

(*) Notice: Subject to any disclaimer, the term of this patent is extended or adjusted under 35 U.S.C. 154(b) by 167 days.

This patent is subject to a terminal disclaimer.

(21) Appl. No.: 13/440,788

(22) Filed: Apr. 5, 2012

(65) Prior Publication Data

US 2012/0193064 A1     Aug. 2, 2012

Related U.S. Application Data

(63) Continuation-in-part of application No. 13/087,318, filed on Apr. 14, 2011, which is a continuation-in-part of application No. 12/149,670, filed on May 6, 2008, now Pat. No. 7,926,274.

(Continued)

(51) Int. Cl.
| | |
|---|---|
| *F01K 23/06* | (2006.01) |
| *F01K 3/00* | (2006.01) |
| *F28D 20/00* | (2006.01) |
| *F28F 23/00* | (2006.01) |
| *B60K 3/00* | (2006.01) |

(Continued)

(52) U.S. Cl.
CPC ... *F01K 3/00* (2013.01); *B60K 3/00* (2013.01); *F01K 15/02* (2013.01); *F01K 25/10* (2013.01); *F22B 27/16* (2013.01); *F28D 20/0034* (2013.01); *F28F 23/00* (2013.01)

(58) Field of Classification Search
CPC .......... F01K 3/00; F01K 15/02; F01K 25/10; F28D 20/0034; F28F 23/00; B60K 3/00

USPC .......... 60/659, 670, 671, 651, 653, 660, 662, 60/664, 668; 219/688, 687, 679, 757; 165/10, 158

See application file for complete search history.

(56) References Cited

U.S. PATENT DOCUMENTS

| | | | |
|---|---|---|---|
| 3,794,801 A | * | 2/1974 | Long et al. ................. 180/304 |
| 3,891,817 A | | 6/1975 | Brown |

(Continued)

FOREIGN PATENT DOCUMENTS

| | | |
|---|---|---|
| CA | 2078708 | 3/1994 |
| CN | 1731035 A | 2/2006 |

(Continued)

*Primary Examiner* — Kenneth Bomberg
*Assistant Examiner* — Wesley Harris
(74) *Attorney, Agent, or Firm* — Richard C. Litman

(57) ABSTRACT

The efficient heat exchange system provides a rapidly rechargeable thermal energy storage bank operably connected to a heat engine capable of use in an electric power generation facility or in a vehicle. Microwave energy is supplied to the system via a network of waveguides. The thermal energy storage bank has a slurry in a heat exchanger capable of sustaining operation of the engine without requiring the microwave source. The slurry provides a mixture of powdered stainless steel and silicone oils functioning as the working fluid in the hot side of the heat exchanger. The slurry may be heated by plugging the system into standard AC power for a predetermined microwave heat charging duration. A closed, triple-expansion, reciprocating Rankine cycle engine capable of operating under computer control via a high pressure micro-atomized steam working medium is provided to propel the vehicle.

15 Claims, 10 Drawing Sheets

Related U.S. Application Data

(60) Provisional application No. 60/929,012, filed on Jun. 8, 2007, provisional application No. 61/630,742, filed on Dec. 19, 2011, provisional application No. 61/629,912, filed on Dec. 1, 2011, provisional application No. 61/627,154, filed on Sep. 19, 2011, provisional application No. 61/516,512, filed on Apr. 5, 2011.

(51) Int. Cl.
    *F01K 15/02*    (2006.01)
    *F01K 25/10*    (2006.01)
    *F22B 27/16*    (2006.01)

(56) References Cited

U.S. PATENT DOCUMENTS

| | | |
|---|---|---|
| 4,064,852 A | 12/1977 | Fulenwider, Jr. |
| 4,148,192 A * | 4/1979 | Cummings ............... 60/716 |
| 4,310,738 A | 1/1982 | Moretti et al. |
| 4,956,534 A | 9/1990 | Martin |
| 5,286,939 A | 2/1994 | Martin |
| 5,512,734 A | 4/1996 | Copstead |
| 6,064,047 A | 5/2000 | Izzo |
| 6,993,898 B2 | 2/2006 | Parkin |
| 7,926,274 B2 | 4/2011 | Farkaly |
| 2004/0099261 A1 * | 5/2004 | Litwin ............... 126/638 |
| 2004/0139723 A1 | 7/2004 | Parkin |
| 2005/0139594 A1 | 6/2005 | Jones et al. |
| 2006/0049184 A1 | 3/2006 | Garboski |
| 2006/0107585 A1 | 5/2006 | Gupta |

FOREIGN PATENT DOCUMENTS

| | | |
|---|---|---|
| DE | 41 28 103 A 1 | 2/1993 |
| DE | 19701094 A 1 | 7/1998 |
| JP | 7-316830 | 12/1995 |
| WO | WO 0027992 | 5/2000 |

\* cited by examiner

EFFICIENT HEAT EXCHANGE SYSTEM FOR STORING ENERGY

CROSS-REFERENCE TO RELATED APPLICATION

This application is a continuation-in-part of U.S. patent application Ser. No. 13/087,318, filed Apr. 14, 2011, which is a continuation-in-part of U.S. patent application Ser. No. 12/149,670, filed May 6, 2008, now U.S. Pat. No. 7,926,274, which claimed the benefit of U.S. Provisional Patent Application No. 60/929,012, filed Jun. 8, 2007. This application also claims the benefit of U.S. Provisional Patent Application Ser. No. 61/630,742, filed Dec. 19, 2011, U.S. Provisional Patent Application Ser. No. 61/629,912, filed Dec. 1, 2011, U.S. Provisional Patent Application Ser. No. 61/627,154, filed Sep. 19, 2011, and U.S. Provisional Patent Application Ser. No. 61/516,512, filed Apr. 5, 2011.

BACKGROUND OF THE INVENTION

1. Field of the Invention

The present invention relates to heat exchangers, and particularly to a Rankine engine with an efficient heat exchange system that may be used, for example, to power a vehicle without expending non-renewable fuel (i.e., traditional fossil, alcohol, hydrogen, soy or agriculturally based fuels, for example), to power the engine.

2. Description of the Related Art

Chemical energy in the form of batteries has been used since the dawn of automotive history for storage of electrical energy required to operate the automobile. Modern hybrid automobiles use the rechargeable energy storage system (RESS) with a small diesel or gas engine to turn electrical generating equipment and battery banks. However, batteries are not an optimal energy storage solution due to their poor charge time-to-discharge ratios and their toxicity upon disposal.

Microwave radiation has proven to be efficient at heating powdered metals in the sintering process, since powdered metal offers minimum reflectivity. Certain stainless steel alloys exhibit tremendous heat capacity, nearly that of water. Powdered metal in an oil, a semi-viscous media, to produce a slurry may provide a substantial improvement over current thermal energy storage technology. Permeable powdered metal in a silicone oil, for example, may be heated by microwave energy in minutes, rather than the comparative hours (and significant expense) of battery recharging.

The ability to charge the working fluid of a heat exchanger in minutes instead of hours, along with the removal of the expense of maintaining, exchanging and replacing batteries, may be highly appreciated as current technology hybrid vehicle accrue mileage and extend their usage the present environment.

Thus, an efficient heat exchange system for storing energy to be used solving the aforementioned problems is desired.

SUMMARY OF THE INVENTION

The efficient heat exchange system has a rapidly rechargeable thermal energy storage bank operably connected to a heat engine, which is capable of propelling a vehicle. The Rankine engine with an efficient heat exchange system includes a vapor phase change engine connected to an electrical power supply. An energy storage heat exchanger is further provided, and a permeable powdered metal-ceramic matrix is disposed therein. A microwave energy source is mounted proximate the energy storage heat exchanger.

A waveguide network is coupled to the microwave energy source, and a high operating temperature slurry adapted for heating under microwave energy exposure is further provided. The waveguide network selectively directs energy from the microwave energy source to the slurry, with the permeable powdered metal-ceramic matrix being positioned coincident to the high operating temperature slurry, such that the permeable powdered metal-ceramic matrix accelerates the heating of the high operating temperature slurry when the electromagnetic energy is applied thereto.

The slurry is driven in a closed loop within the heat exchanger, and a working fluid is also circulated through the heat exchanger to transfer thermal energy from the slurry to the working fluid in order to effect phase change of the working fluid from a liquid to a high pressure gas. The high pressure gas is directed to an inlet of the engine in order to operate the engine, and electricity is produced under gas power from stored heat energy in the slurry until the slurry cools down to a temperature ineffective to cause the working fluid to change phase. A resonant cavity is formed about the heat exchanger, such that the slurry is co-located within the resonant cavity.

Preferably, a working fluid pump is provided for driven circulation of the working fluid. A plurality of manifolded high pressure output lines extend from the fluid pump. A plurality of gasifier tubes are further mounted proximate the heat exchanger, with the plurality of gasifier tubes receiving the working fluid in its liquid phase from the manifolded high pressure output lines. The gasifier tubes output the high pressure gas phase of the working fluid. Preferably, at least one atomizer is disposed within each gasifier for atomizing the working liquid in its liquid phase upon input to the gasifier.

In addition to be used in vehicles, the present system may also be integrated into large scale power grids. The system could be used to supplement present power grids, remove homes and businesses from the power grid, or be used in conjunction with other sources of power, such as solar power, wind turbine power, etc., using the present system not only for energy production but also as an energy storage system. The slurry acts as a thermal storage medium, and the overall system is capable of constant flow-through of this thermal storage medium, thus allowing relatively large amounts to be heated. The permeable powdered metal-ceramic matrix is inundated with the thermal storage medium in a constant-flow fashion, with the medium being slowly pumped through a resonant cavity to thermalize the medium. Labyrinthine traps within the cavity facilitate constant flow of the thermal storage medium with no microwave energy loss from the resonant cavity. The microwave energy couples instantly to the permeable powdered metal-ceramic matrix, thus full power from the magnetron tube is always provided, with no gradual coupling constant.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
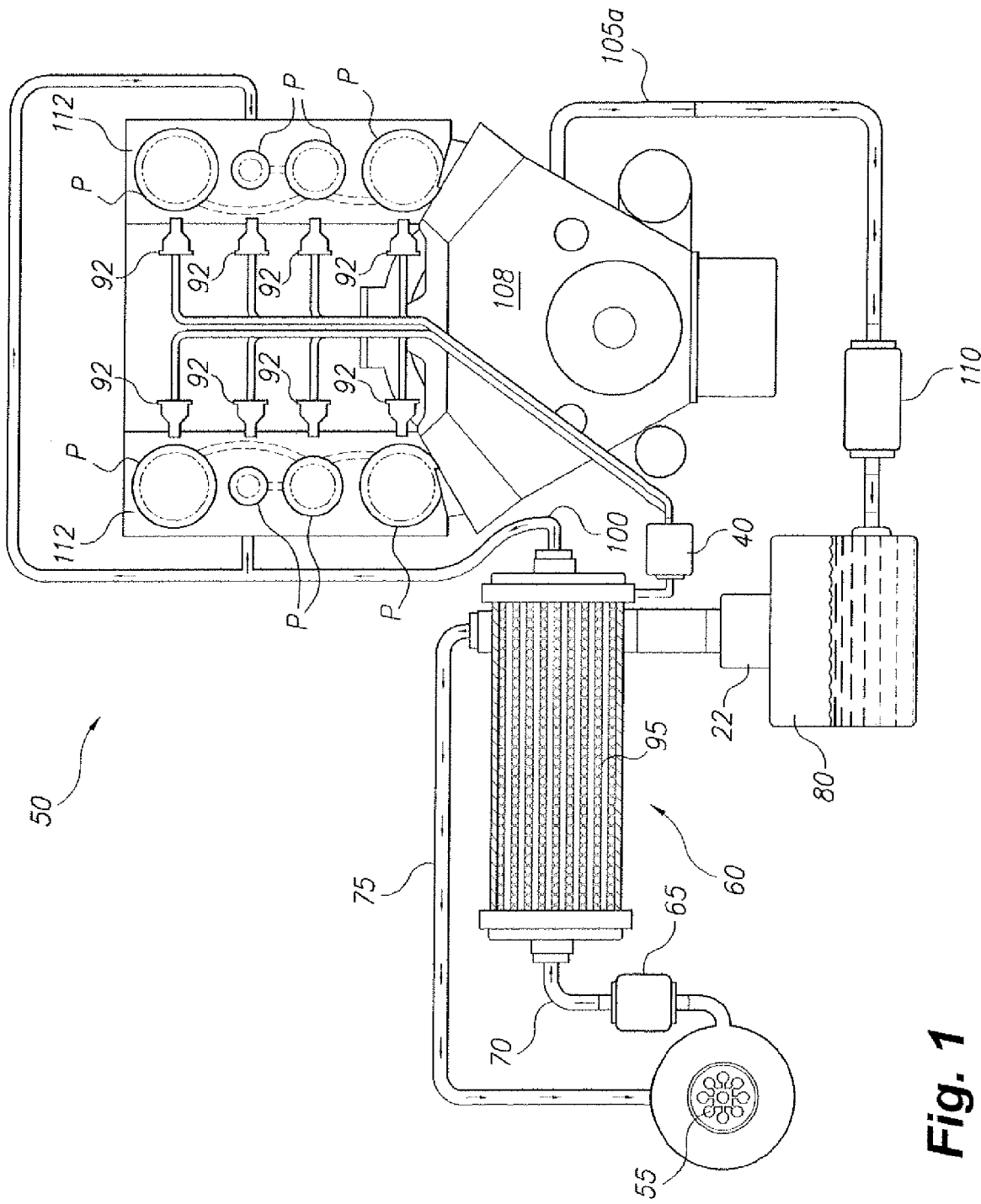
FIG. 1 is a diagrammatic overview of a Rankine engine with an efficient heat exchange system according to the present invention.
Figure 2A:
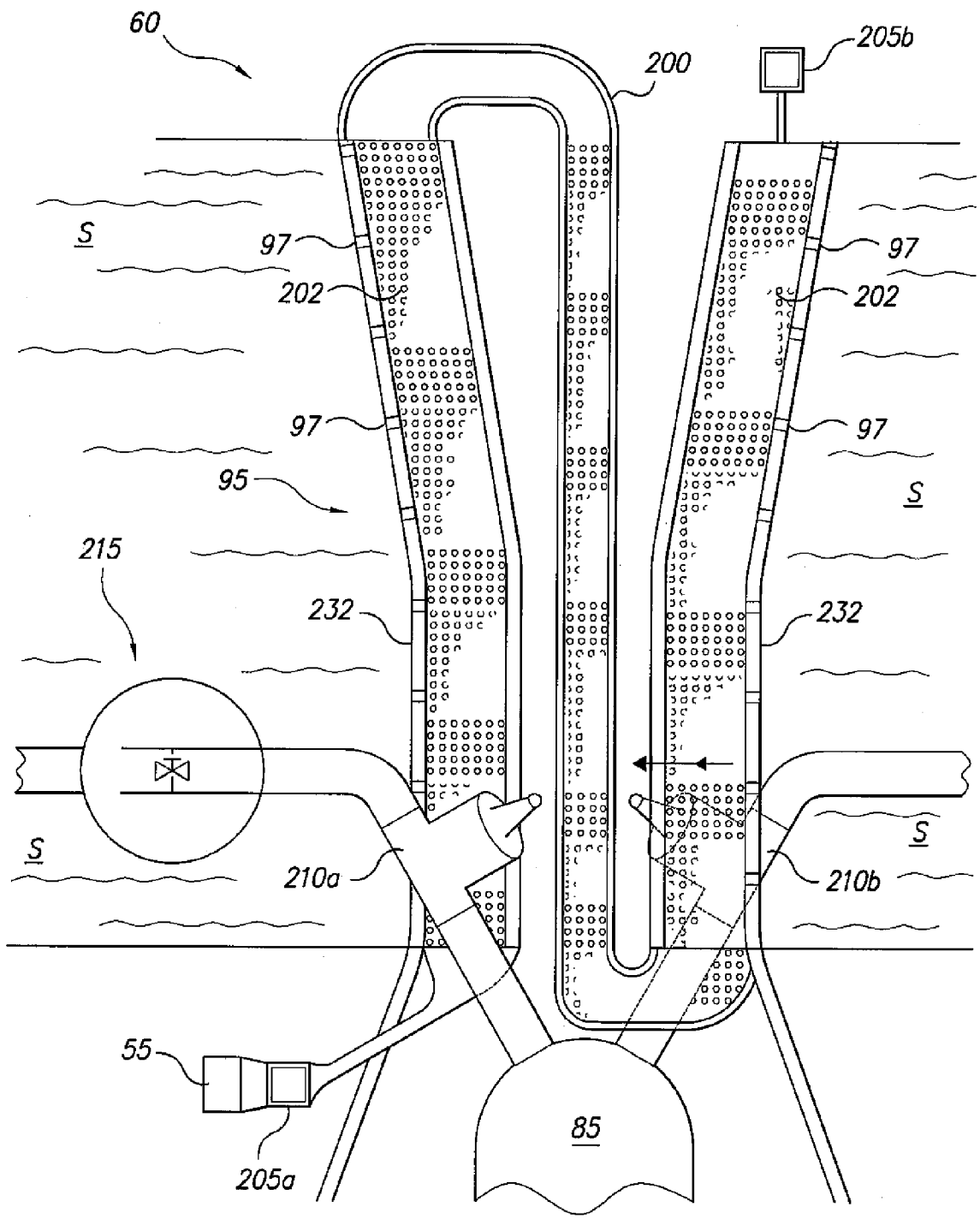
FIG. 2A is a partial diagrammatic sectional view of heat exchanger internal components for the Rankine engine, showing general layout of components and internal geometric configuration of the assembly.
Figure 2B:
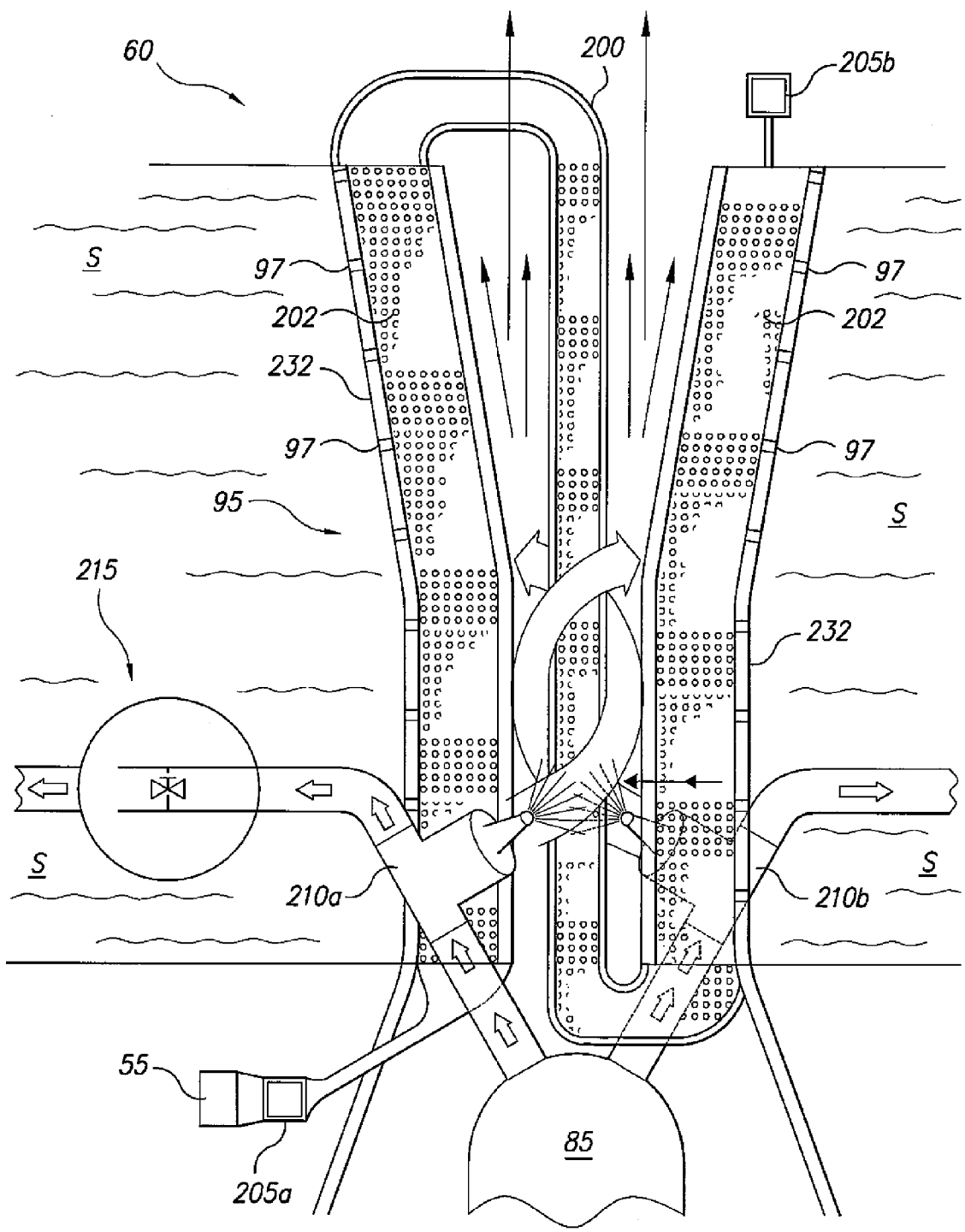
FIG. 2B is a partial diagrammatic sectional view of heat exchanger components of the efficient heat exchange system illustrating heat exchange and production of working gas during operation of the Rankine engine.

As shown if FIGS. 1, 2A and 2B, the present invention relates to an efficient heat exchange system, especially for use with a Rankine engine. The Rankine engine has a quickly rechargeable thermal energy bank with a slurry S circulating through an energy storage heat exchanger 60, such that the slurry S can be rapidly heated by electromagnetic energy in the form of microwave heating. The microwave energy may be supplied to the system via a network of waveguide/heat exchange gasifier tubes 200 and waveguide interconnections 205a and 205b (best seen in FIGS. 2A and 2B).

The microwave source may include, but is not limited to, at least one magnetron tube 55 that can be coupled to the waveguide network at waveguide interconnection 205a. The magnetron 55 can be charged by time and/or distance of desired operation; e.g., a commuter trip may be estimated for travel time or calculated by GPS or the like for distance. Under computer control, a high pressure fed, finely atomized working fluid is dispersed tangentially into a favorable low pressure environment, which is created and enhanced through heat exchanging gasifier tubes having a velocity-pressure trade-off enabling geometry, thus ensuring a minimum amount of stored thermal energy is drawn from the system under normal operating conditions to achieve the trip, preferably maintaining a safety reserve. Since the magnetron(s) 55 may be a part of the onboard system 50, thermal recharging stations could be located conveniently at places of employment or popular destinations, en route smart-rail recharging stations or, alternatively, using regenerative braking in a feedback loop. The ability of the magnetron 55 to deliver the energy quickly precludes time and energy consuming recharging periods.

The thermal energy storage of slurry S in heat exchanger 60 can sustain operation of a Rankine cycle engine 108 to operate a vehicle for extended periods of time without a constant or direct connection to an electrical power grid, while retaining the potential to be quickly and conveniently recharged en route, if necessary. The slurry S is an engineered slurry formed from, for example, highly refined micro-powdered stainless steel and finely powdered ceramic materials in a viscous or semi-viscous mixture combined with silicone-based oils or in combination with other suitable materials of high heat capacity, such as clays or salts, which may repeatedly absorb, retain, and disperse the waveguide supplied microwave energy. As will be described in detail below, the slurry S is used to store thermal energy as a type of thermal battery that can be used to power a vehicle via a Rankine type engine.

Heat retentive viscous fluid of high heat capacity, such as a silicone-based oils, or the aforementioned engineered slurry, is capable of functioning as the thermal energy supply fluid in the hot side of the heat exchanger 60. Some degree of viscosity is preferred in the engineered slurry S so that the slurry S can be slowly pumped through, or directly heated by, a permeable matrix containing the waveguide connections in order to bring it up to (and maintain for extended periods) the maximum possible storage of heat energy (without significant outgassing). The viscous nature of the slurry is ideal for maximum heat transfer to the working fluid, while limiting deleterious oxidation events to the primary matrix. Liquid ceramics, liquefied metals, clays, salts or combinations thereof may be used in place of silicone oils as the optimum engineered thermal energy retention fluid.

Figure 3:
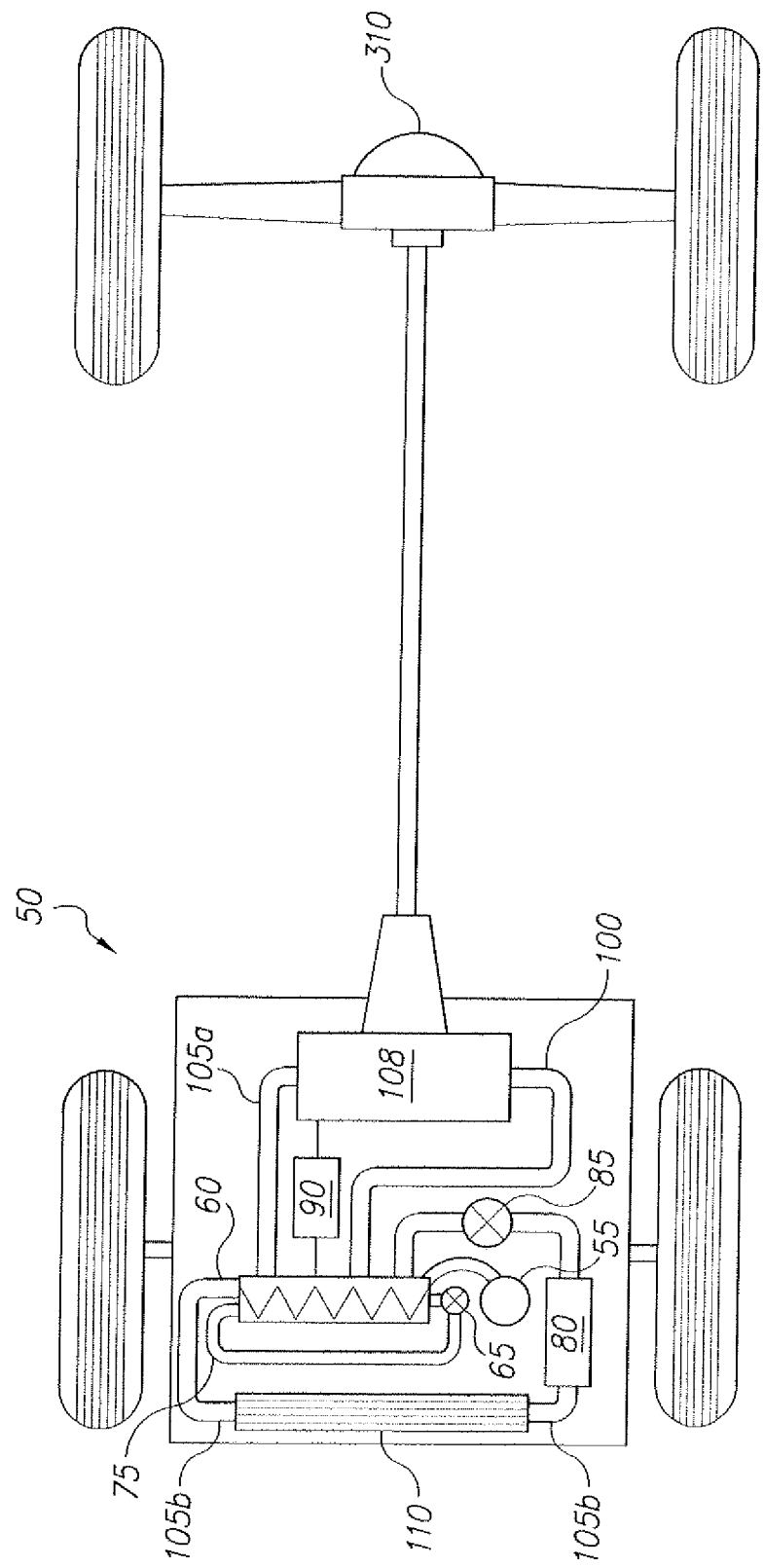
FIG. 3 is a diagrammatic top view of an automobile equipped with the Rankine engine with the efficient heat exchange system according to the present invention.

The stored thermal energy produces the last percentage of conversion of the pre-heated engine working fluid (preheated by first circulating, via preheat line 105b, proximate the slurry in heat exchanger 60, as shown in FIG. 3) to the working gas as produced in the variable cross-section tubes 95 of heat exchanger 60. The cross-sectional geometric change of tubes 95 facilitates the vapor phase transformation through localized reduction of withdrawn thermal energy requirements from the thermal reservoir.

Insulation is provided in order to maintain the slurry S at sufficient temperature to effect the conversion, and may include a plurality of layers of zirconium applied by plasma-spray process or the like, over which several inches of ceramic-based insulation may be applied. Vacuum chambers, other thermal barriers, etc., may be introduced into the layers of insulation in order to reduce radiated heat from the entire device to a negligible level.

Preferably, the heat exchanger 60, including gasifier tubes 95, is constructed primarily of an austenitic nickel-base superalloy, such as Inconel®, manufactured by the Huntington Alloys Corporation of Huntington, W. Va., or other typically high temperature-resistant material, preferably with a high-nickel content, such as the superhigh performance alloy Hastelloy®, manufactured by Haynes International, Inc. of Kokomo, Ind., or the like, capable of withstanding the long duration elevated temperatures of the slurry S. The heat exchanger operates to draw thermal energy from the heated slurry S, which may either thermosiphoned or, alternatively, may be mechanically pumped across a plurality of shaped diffuser tubes 95. The advantage of the powdered metal, or a permeable powdered metal/ceramic matrix coincident to the slurry S, is the ability to be heated almost instantly to extreme temperatures by the supplied microwave energy. Powdered materials absorb microwave energy readily, as they display huge cumulative surface area and low coefficients of reflectivity. The engineering of a strategically positioned permanently permeable matrix composed of a mixture of compressed powdered materials, both ceramic and metal based, provide sufficient waveguide conductivity to repeatedly heat within a near percentage of solidification/coalescence, while retaining capability of efficient heat transfer to slowly circulating heat retentive slurry.

The quantity of slurry S in the base of the heat exchanger 60 is sufficient to ensure adequate thermal energy transfer in order to operate the engine 108, which is capable of operating via a high pressure micro-atomized steam working medium. The slurry S may be heated by plugging the system into standard AC power for a predetermined heat-charging duration, or, alternatively, by utilizing an en route rail charging system while the vehicle is on the road.

As will be described in detail below, the system uses electrical energy to rapidly generate and store sufficient thermal energy to power a vehicle for several hours. This is accomplished through the rapid and efficient coupling of microwave energy into a microwave-absorptive material with a high thermal energy storage capacity. As shown in FIGS. 2A, 2B and 3, the Rankine engine with an efficient heat exchange system includes an on-board microwave generator 55 (OBMWG) connected to a heat exchanger 60 via waveguide interconnection 205*a*. High temperature slurry pump 65 slowly pumps the slurry S via slurry supply line 70 through a "hot" side of heat exchanger 60. The slurry S recirculates back to the slurry pump 65 via slurry return line 75. In actual practice, the slurry reservoir and the heat exchanger 60 can be most efficiently constructed and thermally insulated as a single integral unit.

As best shown in FIGS. 2A and 2B, the waveguide interconnection 205*a* in the heat exchanger 60 joins an enclosed, circular, heat transfer/waveguide continuation tube 200 that is disposed concentrically within the internally hourglass shaped gasifier tube 95. Tube 200 acts as a central conductor of thermal energy, an axis about which the finely atomized working fluid is dispersed. The atomized working fluid is thusly exposed to the maximum possible area of heat exchanger wall surface area to promote efficient heat transfer.

There may be plurality of such gasifier tubes 95 disposed adjacent to each other within the heat exchanger 60. The gasifier tube 95 is configured so that the engine-driving work fluid is kept isolated from the slurry S. The working fluid powering engine 108 may be a variety of formulation, including, but not limited to, pure water, a recapturable refrigerant, such as ammonia or Puron®, manufactured by Koch Membrane Systems GmbH of Germany, combinations thereof or the like.

Disposed inside the central heat absorption/transfer tube 200 is a continuation of the waveguide charged permeable powdered metal and ceramic matrix member 202. As shown in the section drawing of FIG. 2A, the central conductor of the heat rejection tube 200 interconnects the two wall-adjacent portions of the tube 200. In actual practice, the matrix 202 extends about the entire circumference of the variable cross-section gasifier tube. Preferably, member 202 is capable of high electromagnetic energy absorption, while encountering minimal reflection from the waveguide charged by magnetron 55. Members 202 may also remain capable of repeated extreme thermal cycling without significant degradation of material properties, such as permanent permeability, in order to act as an efficient conduit for thermal energy introduced into the entire slurry S.

Microwave energy conducted through the absorption tube 200 effects a conversion of electromagnetic (EM) energy into thermal energy, rapidly heating anything in contact with, or inside, the tube 200. The tube 95 has a plurality of perforations or slotted opening 97 through its outer walls 232. The slotted openings 97 allow slurry S circulating throughout the heat exchanger 60 to enter, remain, and gradually flow within the central heat absorption/transfer tube 200.

Since the slurry S has a directional flow (imparted by slurry pump 65) from the integral slurry reservoir through the heat exchanger gasifier tube section 60 to the opposite end of the heat exchanger 60, slurry S circulates throughout tube 200 and will flow directionally through absorption tube 200 until it can escape back to the common reservoir of heated slurry through the slotted openings 97 on the opposite side. This slow directional flow of high heat capacity slurry S in constant contact with the walls of the gasifier enables the maximum amount of thermal energy dispersal into the regime of the highly atomized working fluid. Slurry S that flows through the heat absorption tube 200 in this manner may be initially heated and then remain heated for extended periods to temperatures between approximately 1100° C. to 1300° C. (the maximum temperature remaining below sintering threshold, whereupon the slurry charging matrix may coalesce into a solid, losing some degree of its desired permeability, EM energy absorption capability, and further, the ability to transfer heat to the slurry). Inconel® 718 or higher temperature capable grade superalloy is the preferred material for gasifier tube 95 construction, as it maintains sufficient structural integrity to house the powdered metal and ceramic matrix at or near sintering temperatures, while repeatedly performing it's role as a structured enclosure of geometry as a gasifier.

Microwave radiation has proven to be highly efficient at heating powdered metals. Thus, the powdered metal suspended in silicone oils offers the ability to flow through a heat exchanger and transfer heat energy to the diffuser tube, while minimizing outgassing, and can be maintained in a vacuum to improve retention of thermal energy, while limiting oxidation. It is contemplated that the slurry S can retain these temperatures for a considerable duration once the microwave energy is removed from the waveguide.

Referring again to FIG. 3, working fluid originates in reservoir 80, which is connected to the working fluid supply high pressure pump 85, which, in turn, has an output connected to the heat exchanger 60. As shown in FIG. 2B, high pressure pump 85 has a manifolded output, which connects to a pair of atomizer nozzles 210*a* and 210*b* disposed tangentially within opposing sidewalls 232 of each one of the gasifier tubes 95. The pump connection places atomizer nozzles 210*a* and 210*b* (and all succeeding nozzles plumbed in a plurality of gasifier tubes) in a commonly manifolded arrangement connecting to a pressure regulator 215 having return line 216, and back to reservoir 80. The output line of atomizer 210*b* in FIG. 2A can be connected to a manifold capable of feeding the high pressure working fluid to remaining pairs of atomizers 210*a* and 210*b* in remaining gasifier tubes 95, which form the working fluid portion of the heat exchanger 60.

As shown in FIGS. 2A and 2B, the atomizers 210*a* and 210*b* are disposed in a region of sidewalls 232 above the lower conic section of the gasifier tube 95. The atomizers 210*a* and 210*b* may, alternatively, be disposed in the conic portion of the gasifier tube 95 at or below the geometric transition of the gasifier tube 95, with the location depending primarily on region of pressure gradient advantage. Moreover, the nozzle orientations of atomizers 210a and 210b are preferably non-coplanar with respect to one another. The non-coplanar orientation of the atomizers 210a and 210b may be provided to facilitate a spiraling action of working fluid finely atomized spray/steam around central coincident conductor tube 200, to maximize the time in contact with the highest temperature regime of the gasifier tube.

During motor (non-charging) operations of the device 50, the combination of the high thermal energy of slowly circulating slurry S in gasifier tube 200 and pressure differential created by Bernoulli tube 95 acting upon the spray mist of working fluid ejected from the atomizers 210a and 210b creates a rapid phase change of the working fluid from liquid phase to a steam/vapor phase. The steam/working gas can be manifolded from the gasifier tubes 95 by a computer controlled ingress/egress output manifold that takes working gas from the dome of the heat exchanger and feeds a high pressure steam output line 100. In this way, the working gas can be momentarily stored during periods of deceleration or braking of the vehicle, and a recirculation valve may be employed to reheat or superheat unused or underutilized output working gas. The high pressure steam in output line 100 is ultimately fed to the engine 108. While the engine 108 can be a variety of designs, including but not limited to, a turbine engine or the like, preferably the engine 108, as shown in FIG. 1, has a closed, triple-expansion, reciprocating configuration utilizing a Rankine cycle to do work based on adiabatic expansion of the working medium in the engine 108.

The system in engine 108 may be open if water is used as the working fluid, or may be completely closed (i.e., sealed) if a suitable convertible fluid is used that can be recaptured indefinitely (such as Freon®, manufactured by E.I. Du Pont De Nemours and Company of Delaware, Puron® or a mixture thereof). As shown in FIG. 1, the engine 108 may be a V-8 configuration, having opposing cylinder head 112 and opposing cylinder bores disposed therein (and within the cylinder block of engine 108). A first set of cylinders have a low volume, high pressure bore, a second set of cylinders have a medium volume, medium pressure bore, and a third set of cylinders have a high volume, low pressure bore. Thus, the configuration offers increasing bore and/or stroke in opposed pairs. The high pressure steam output line 100 connects to the first set of bores. The first set of bores (high pressure) may incorporate additional waveguide-fed matrix and slum/locations integral to their chamber heads in order to effect, promote and sustain superheat status of certain eligible working fluid(s) in closest mechanical proximity to the expansion phase.

As shown in FIG. 1, the first set of bores have insulated steam outlet ports connecting to the second set of bores, and the second set of bores have steam outlet ports connecting to the third set of bores. Under electromechanical and/or computer control (e.g., computer and electronically controlled square-wave pulse-activated high degree-of-atomization nozzles, in combination with mechanically controlled cam-action poppet valves), when pistons P in the first set of bores have completed a power stroke, intermediate pressure steam is permitted to escape via steam outlet to drive pistons P in the second set of bores. Subsequently, when the pistons P in the second set of bores have completed their power stroke, lower pressure steam is permitted to escape via steam outlet to drive pistons P in the third set of bores, and when pistons P in the third set of bores have finished their power stroke, the low pressure work medium is exhausted to return line 105a. Basic aspects of the triple expansion engine 108 have long been understood by those of ordinary skill in the art.

As is known by one of ordinary skill in the art, the reciprocating motion of the pistons P is transmitted to a crankshaft, which ultimately powers differential 310 for rotational motion of the vehicle wheels. The precisely controlled timing of steam power through reciprocating engine 108 is accomplished by a set of electrical solenoid or variable timing camshaft actuated poppet valves 92 connected to computer 40 via control lines 91. Common, split, or multiple camshafts can control the entire poppet valve inlet and egress system, which may incorporate methods of variable timing of poppet valve events to achieve localized performance enhancements, such as may be offered by these variations.

As shown in FIG. 3, the return line 105a is routed back to the heat exchanger 60 where the medium can be preheated for another cycle of flow through the heat exchanger 60. The preheated working medium is then routed via line 105b to condenser 110. Output of condenser 110 is routed via continuation of line 105b back to the reservoir 80. The control computer 40 has a control connection to the heat exchanger 60 in order to precisely control atomization flow (typically square wave pulse width) provided to the atomizers 210a and 210b, as well as to perform other functions related to functions of the heat exchanger 60.

The atomizers 210a and 210b are controlled by computer 40 so that only the minimum necessary amount of working gas is produced based on real-time evaluation of current need (i.e., a throttle position versus load calculation). Producing the gas near-instantaneously on a need-only basis allows for significantly reduced consumption of the thermal energy stored in the slurry S. Computer 40 can accept inputs from a variety of sensors disposed in the system in order to make the executive command decisions required to achieve the objective of the on-demand vapor/steam supply.

Preferably, computer 40 is a digital convertible fluid injection (DCVI), and is capable of accurately addressing the pulse width of the liquid atomization nozzles 210a and 210b in the heat exchanger 60, as well as the pulse width of the solenoid operated poppet valves 92 in the inlet of engine 108. For example, computer 40 can take a reading of the exhaust gas pressure and temperature, and loop it back to the gas-producing nozzle pulse width. Hence, the device is both load and demand (acceleration or deceleration) sensitive to real time.

Sensors may additionally be added to read inlet (liquid) feed temperature and pressure (from feed pump), working gas temperature and pressure in the plenum/dome, load encountered, condition desired (accelerate/decelerate/stop/reverse), mean effective pressure in any of the cylinders (high/medium/low pressure) to vary the timing of poppet valve events through such mechanisms as multiple cam/articulating rocker arm stanchions/lobe advance, retard mechanisms or the like. Further digitally controlled electrical systems may also be used, such as, for example, solenoid-activated poppet valves. Precise event timing control (DCVI computerized nozzles, as well as poppet valve events) is preferred, as the slurry S gradually and continuously loses temperature to the working fluid as the working fluid transitions to working gas. The longest range is available when only a precise and minimal amount of gas is produced to meet the load and condition requirements.

Figure 4:
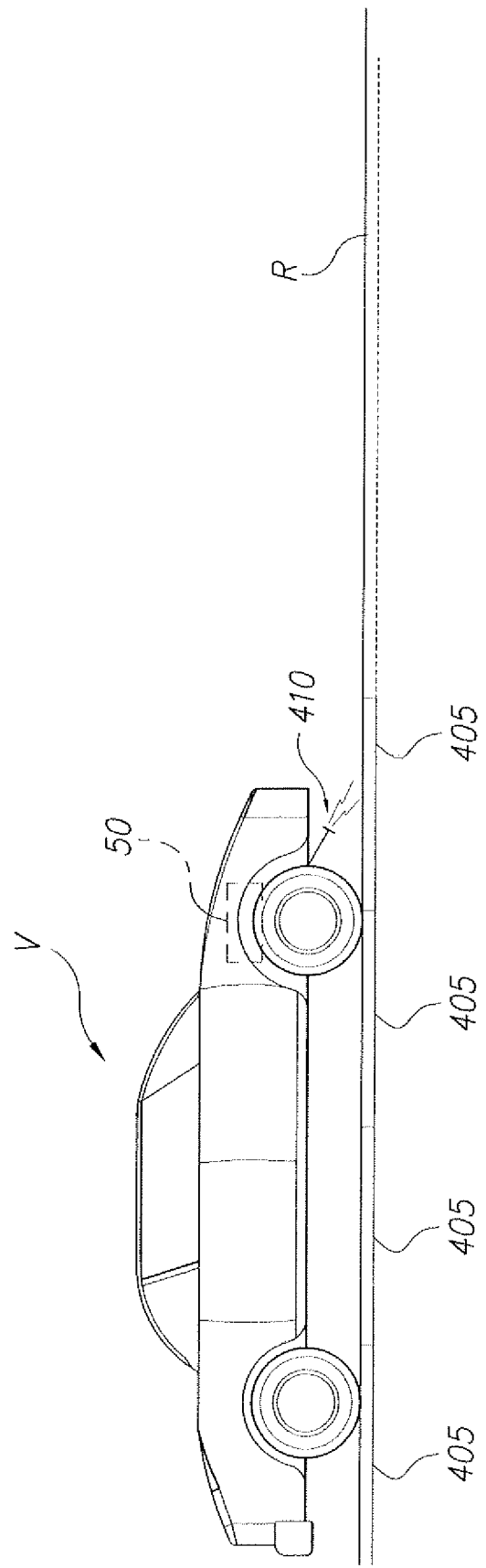
FIG. 4 is a diagrammatic view of an en route charging system for the Rankine engine with the efficient heat exchange system according to the present invention.

As shown in FIG. 4, in the case of en route recharging, a buried smart rail conductor 405 that is essentially flush with a road surface R may be utilized, either by direct contact (such as brush/roller contact) or by inductive coupling, in order to provide the electrical energy necessary to operate the microwave generator 55 or charge a supercapacitor to fire the magnetron 55, when desired, aboard the vehicle V. The rail is segmented by insulation and may be powered by any existing power grid from which preferably rectified DC current can be obtained. Each segment can be fed by a solid state circuit, such as a transistor or SCR circuit, whereby the high current only flows to the particular segment when the associated gating circuit is energized.

The gate of each semiconductor can be actuated by an inductively coupled or otherwise induced discrete signal from the vehicle V directly above it, thereby allowing the smart rail 405 to remain safe from accidental lethal contact by humans, animals, or the like. Segments 405 may be of a length only sufficient for a conducting condition while the vehicle V needing the recharge is directly above it, thereby shielding the rail 405 from accidental contact. As such, rail segments 405 conduct only in response to an induced signal from above, which can come from several sources, such as a coil 410 inducting the trigger (gating) current, an ultrasound device, a laser signal, or any other device that can perform the task of momentarily locally charging the gate of a main power transistor or SCR, which connects the high current power grid to the segmented rail 405, forcing it to conduct. Once the vehicle V has passed beyond a particular energized one of the segments 405, the smart rail 405 returns to a non-conducting and safe condition.

The smart rail 405 may be accessed to charge the on-board microwave generator 55 directly, or to charge a supercapacitor that can store the charge and supply it to the OBMWG 55 whenever desired or necessary. Further, information regarding a particular vehicle V drawing power from the rail can be recorded and used for energy billing purposes. The smart rail system 405 allows a commuter the ability to access the smart rail 405 if in need of a recharge (and have the energy transfer recorded), or pass over it with no energy transfer.

The smart rail 405 may be an ideal en route recharging mechanism for a variety of vehicles utilizing some form of electrical or chemical energy as a means of propulsion, and may be incorporated into existing highways while remaining unobtrusive, safe, and non-interfering with the operation of existing technology vehicles.

With respect to utilizing the inventive Rankine engine in the context of an electrical grid co-generation facility, a need has been articulated for electrical energy storage for the power grid, such as to release stored excess energy produced in off hours and employ it conveniently during peak periods of usage, thus alleviating peaks and brownouts. Additionally, electricity produced from wind, solar, optical, geothermal or tidal sources may fluctuate in intensity. Thus, a storage system for power grid energy would be advantageous to reduce or eliminate these power production fluctuations.

Figure 11:
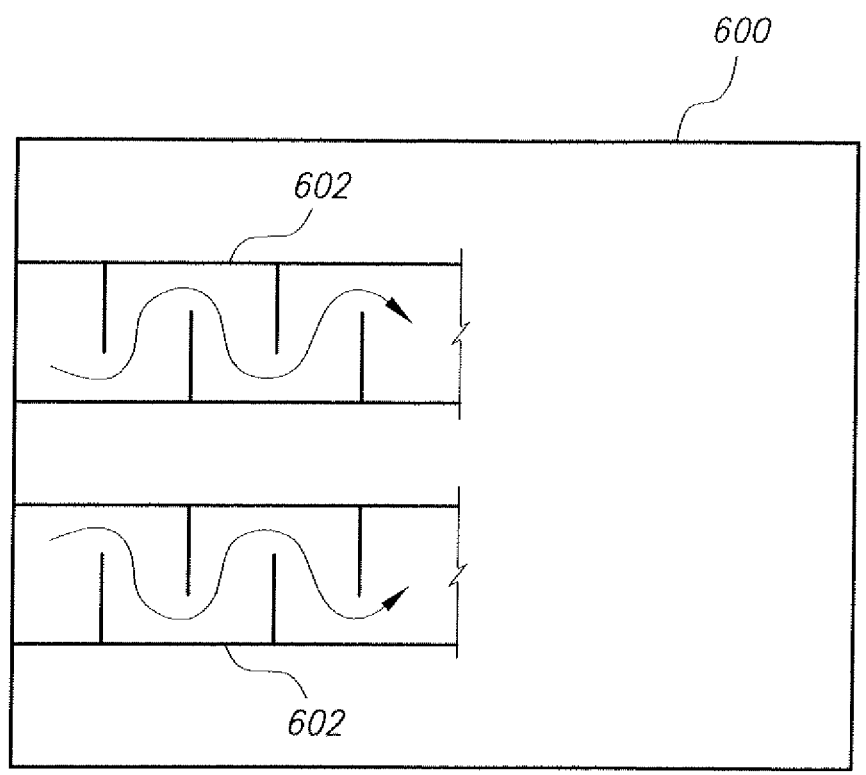
FIG. 11 is a schematic diagram of a resonant cavity and labyrinthine traps according to the present invention.

The microwave-Rankine cycle engine 108 may be used to store the energy as thermal energy, and release it upon demand via a Rankine cycle expander. The microwave-Rankine cycle has been recently described as a "capacitive" function (as described in the formally descriptive terms of Classical Circuit Theory), having a cavity magnetron 55 coupled permanently to what is referred to as a "permanently permeable matrix" (PPM) consisting of a porous powdered semi-sintered (in the necking only) superalloy of relatively small gradient size, typically Inconel®, sandwiched and again sintered between even more highly porous superalloy foam matrix material (or highly porous sinterment of larger gradient powder). The material may include powdered ceramics as well as sacrificial constituents, such as lithium stearate, that may be subsequently leeched out after sintering to precisely control the porosity of the sinterment. Thus, the PPM begins at, or within, the mouth of the waveguide, and may have a surface of specialized geometry (e.g., tetrahedral) tuned by height to some multiple or heterodyne of the microwave frequency to assist electromagnetic energy to efficiently enter the PPM and propagate instantly to a heat retentive slurry co-located within a resonant cavity, schematically shown by reference number 600 in FIG. 11, formed around an efficient heat exchange mechanism. In the above, the term "sinterment" refers to an object created by the sintering of powdered material. The sintering of both metallic and ceramic powders is well known, and most metallic powders can be sintered. It should be understood that the expander can be an engine mechanically coupled to a vehicle drivetrain, or may alternatively be used to turn a generator, alternator or the like in order to generate stabilized powerbase electricity. The resonant cavity both contains the electromagnetic energy and prevents significant loss of thermal energy across its sides. As is conventionally known, a resonant cavity 600 is essentially a metal box similar to a pipeline for electromagnetic energy, also referred to commonly as a waveguide. The microwave energy must couple with the materials in the resonator to produce thermal energy because the microwave energy cannot pass through a metal surface thicker than the effective "skin depth", which is dependent on the microwave signal frequency and the metal's electrical conductivity. In other words, a closed metal container will not allow any microwave energy within it to be passed through its walls and will contain it until it is turned to heat energy. By coating a thermally nonconductive glass or ceramic with an Inconel®, for example, conductive coating of a sufficient thickness, no microwave energy will escape the system. The only energy that will be permitted to exit the enclosed resonator will be thermal energy allowed to pass through gasifier tubes that run through the resonant cavity at ideal locations to minimize unwanted electrical perturbations in the system. It is these gasifier tubes that will serve as the input to the thermally-driven Rankine process engine.

The porous powdered material is typically introduced into the end of the waveguide, typically as a multiple tetrahedral or pyramid shape, with the walls matching the wavelength, or some multiple of the wavelength, of the microwave generator. This is typically, but is not limited to, the S Band (around 2.45 GHz) or the L band (around 915 MHz). The PPM at the waveguide is of a fine gradient, sintered to sphere-to-sphere necking but not to complete coalescence, creating an engineered level, degree, or percentage of porosity. In the case of microwave energy absorption, the key aspect is cumulative surface area, thus the smaller the spherical size of the powder, the more surface area per cubic inch of material. This finer grade of PPM extends from the mouth of the waveguide into the resonant cavity, where it is sandwiched via further sintering operations to what is referred to as "metal foam", which can be as great as 85-95% porous. The powdered superalloy is typically in the 40-45% porous range where it exits the waveguide.

The magnetron is always kept in tune with the load via automated stub tuning, with tuning stubs changing length in response to the voltage standing wave ratio (VSWR) curve caused by warming of the slurry, which is actively monitored and fed back into the tuning stub actuation mechanism consisting of rack and pinion driving miniature electric motors under computer algorithmic control. Preferably, the magnetron is tuned to generate microwave energy having a voltage standing wave ratio of approximately 1:1 with the PPM.

The PPM with co-located slurry thus becomes a permanently tuned antenna or, more precisely, a dummy load for the magnetron, thus relieving the slowly ramping coupling curve associated with using microwave energy to heat a bath of molten salt or saltpeter (as an exemplary thermal storage media). In applications where the PPM is not present, the coupling between microwave energy and salt is temperature dependent, and the coupling is slow to initiate until such time as the salt has warmed considerably, at which point the coupling increases along a curve. This is highly disadvantageous to the mechanism as a whole, where immediate coupling is desirable. The PPM acts as the primary agent of relatively instantaneous microwave energy-to-slurry coupling, in concert with the computerized stub tuning continually maintaining the VSWR at low levels. When the system is first turned on, the microwaves generated by the magnetron will heat the PPM that then heats the slurry S until it is able to be heated by the microwaves directly.

Further, the magnetron and the PPM may be divided into segmented ceramic tubes, highly insulated with Aerogel®, manufactured by Dunlop Slazenger Group Limited of the United Kingdom, or the like, feeding a common (or at least partially common) thermal reservoir of some magnitude of volume, thus allowing the thermal storage to be segregated by input power. This operates to get the slurry up to temperature rapidly (700° C.-788° C.) using the stub tuned matching networks, and then adding the magnetron(s) and the PPM incrementally (in segregated ceramic tubes) to bring additional molten salt or high thermal diffusivity slurry up to temperature, until such time as the entire reservoir may be held at highly elevated temperature. This segregation allows various levels of energy storage, like a multi-cell battery, with each PPM tube or cell contributing to the overall system, but not creating a situation where the entire slurry cell is always common, whereby relatively low input energy creates a relatively useless (thermally diluted) large volume of low temperature slurry.

Heated slurry can then be readily used to perform work, particularly in the form of Rankine cycle expansion, as has been described in Applicant's prior U.S. Pat. No. 7,926,274, which is hereby incorporated by reference in its entirety. Multiple expansion Rankine reciprocation with optional pressure exchange may be applied to automobiles, trucks, aircraft and the like, along with emulated turbine devices driving superconducting alternators. It should, however, be understood that the slurry can power (through heat exchangers providing gasification of a working fluid) conventional Rankine expanders, such as bladed turbines driving conventional generators or the like.

The emulated turbine is a device based upon a three element pressure exchanger with airfoil blades transposed along their chord lines, forming continuously devolving but relatively finite volume chambers, rather than the high-gas-throughput inherent to the conventional bladed multi-stage turbine. The conventional bladed turbine, a takeoff of the water wheel, is highly wasteful of working gas, in either Brayton or Rankine cycles. Reciprocating devices have reversals in motion and higher internal friction, although they are somewhat more economical of working gas, particularly when insulated with zirconia plasma-applied thermal barrier coatings on all exposed surfaces, piston tops, valve heads, cylinder walls, and inside ports. The drawbacks to reciprocals are the inherent exponential volume increase as pistons move downwards in individual cylinders, resulting in high friction due to piston rings, and further valve springs and lubrication-induced viscous drag.

Emulated turbines offer the same thermal barrier application possibilities, while keeping the controlled expanding volume of the contra-rotating formed chambers to a more manageable condition. This is accomplished through a multi-axis (linear) movement of the already contra-rotating concentric drums that continually form and reform, the devolving chambers. Devolving chambers can thus be fed working gas segmentally, depending on precise torque requirements, allowing the chambers to remain at peak thermal insulative capacity, unlike a bladed turbine where any lessening of volume or temperature of impinging gas lowers the temperature (and thus efficiency) of the turbine. These drawbacks make the bladed turbine most efficient only at high and steady maintained torque producing output, they do not throttle efficiently, and are not thermally efficient at less than ideal torque outputs. The individualized constantly devolving chambers of the emulated turbine can be segregated as to input of working gas, thus the efficiency remains high at all levels of torque output.

Working gas is produced in the heat exchange portion of the large thermal (slurry) reservoir. As noted above, the slurry is co-located with the PPM, and the porous PPM is inundated in slurry, thus heating the slurry quickly through instantaneous coupling to the microwave generator (cavity magnetrons). The slurry surrounds the gasifier tubes, which are geometrically advantageous (for improved gasification) of a Rankine working fluid, of which water can be readily used in power grid storage/production.

In an exemplary Rankine multi-expansion reciprocating expander side portion of the device, the gasifier tubes are integral to the expander, allowing short path recirculation, multi-path superheating, stage-to-stage re-pass through the heat exchanger, and pressure exchange from high pressure (HP) to low pressure (LP) stages using conventional pressure exchangers (such as a straight, longitudinal, semi-circular concave multiple-channel on a rotating drum with valved/ ported stationary end plates) or the three element pressure exchanger with a stator section.

As a further alternative, a direct working gas producing magnetron may be utilized. The magnetron is formed with a lens mechanism that allows microwave energy heated fine metal powder (heated to incandescence) to continuously circulate through the lens. This powder is mixed with finely atomized working fluid within the lens, where it transfers heat directly to the atomized working fluid, and is then returned endlessly to a powder reservoir via electromagnetic deflection. Microwave energy is readily absorbed by the small gradient powder, due to its relatively large combined surface area, contrasted to microwave energy heating water directly by bipolar stimulation, which is highly inefficient in the production of large quantities of superheated working gas.

The heated powder, superalloy or ceramic material transfers heat instantly to the highly atomized fluid within the lens, which is formed adjacent to the magnetron or is integral therewith. Thus, both dipolar heating as well as direct conductive heating from the incandescent powder occurs simultaneously within the lens. Atomization can be improved with piezoelectric diaphragm injector nozzles that break up the already fine working fluid spray into pure fog.

The direct gas producing magnetron, with the aforementioned mixing lens, is convenient to maintain operating temperature and lower torque rotation of the Rankine expander, particularly an expander as described above, where the input gas can be effectively throttled; i.e., where the expansion events are discernible one from the other, either in individual cylinders, or devolving chambers. These gas producing lensed magnetrons may be coupled to individual inlets of reciprocating devices or discretionary chambers of an emulated turbine device, thus keeping rotation of the expander underway. At all times, the current supplied to the rotating field of the alternator would be coupled to the available torque production of the lensed magnetrons, when overpeak power exists, and when underpeak conditions come into play the thermal batch of salt as described earlier is added to the total working gas production mix through the novel three element heat exchange mechanism; i.e., the magnetron, the PPM, the heated slurry, the working gas production system, etc., as described in Applicant's prior U.S. Pat. No. 7,926,274.

The direct gas producing magnetron with the lens, as described above, may also be employed to maintain a liquid condition of the molten salt (keeping it above solidification temperature). This may be readily accomplished by directing the gas through heat exchange tubing and through the energy storing vat of slurry on its way to the expander, where it maintains temperature and some measure of rotation of the expander/alternator (i.e., the generator). The objective of this is to maintain the slurry within a range of temperature that equates to manageable VSWR range, a range that is accommodated by the automated stub tuning. Thus, when over-peak power is available from the power grid, the device is immediately ready for energy storage, the slurry is liquid, and the expander is turning over and at sufficient temperature to ensure proper sealing and adequate internal lubrication.

With respect to magnetron tube 55, the objective of using a direct gasification magnetron is to create a vortex of incandescent powder mixed homogeneously with finely atomized vapor admitted through high pressure atomizing nozzles. The powder, typically a superalloy with sufficient ferritic component to be influenced by magnetic fields, absorbs microwave energy directly due to its relatively large combined surface area, and transfers heat efficiently to the atomized working fluid. The working fluid can be further atomized in a combination type nozzle, such as one that combines a piezoelectric disperser element along with multiple tiny exit passages in the nozzle tip.

The lens may be formed as a helix, with powder fed from a reservoir into a blower arrangement consisting of compressed gas or air. The powder can be alternately fed by gravity, pressure, or picked up via suction. Fed into the helical vortexer under considerable pressure, the vortexer forms a resonant cavity that transfers microwave energy to the powder/atomized working fluid combination, instantly gasifying the fluid within the short area of the lens. The lens exit might be a charged screen matrix, which readily passes the superheated gas while redirecting the powder back to its reservoir. The alternate helical arrangement of the vortexer is useful in helping to aim the powder in an advantageous direction, along with electromagnetic steering of the powder, which may be accomplished via electromagnetic coil or as part of a high voltage flyback transformer arrangement. This facilitates powder/particle steering out of the produced gas stream and back to its reservoir, from where it is endlessly recycled.

The helical resonant cavity may be formed by winding a hollow tube of some diameter into a tight helix (i.e., with no space between the windings) and then boring the center of the tube out to reveal a helical track within which the pressurized powder rotates along as if within a hollow screw thread. This vortexing activity prolongs the time that the powder is exposed to the microwave energy, and absorbs this energy instantly, which is typically more rapidly than the atomized working fluid alone can absorb this energy through traditional dipolar means. One powder reservoir can be situated so as to feed a multiplicity of gasifying magnetrons, which is advantageous when these direct gas producing magnetrons are disposed about an expander operating typically on the Rankine cycle.

Resonant cavities like the vortexing lens are determined by length and diameter/volume as some function of wavelength, and some multiple or heterodyne of the wavelength. The exit screening of the cavity might incorporate sufficient electromagnetic charge as to render it relatively opaque to microwave energy escape. This lens exit may form a constricted outlet, such that only higher pressure fully superheated gas may force its exit from the lens through this constriction. The constriction may be formed as a spring loaded poppet or ball seated on a cone, for example.

In cases where the microwave energy escapes from the resonant cavity through this exit, the poppet arrangement can be constructed such that the poppet body includes vanes instead. Alternately, the body may have a pointed or rounded nose. The vanes may extend fully into mirrored hollow vanes in the poppet valve body, thus forming a labyrinth, via labyrinth traps 602 exemplarily shown in FIG. 11, that may be impervious to microwave energy escape but is able to pass high pressure working gas. The gas would escape through the labyrinth when the vaned poppet is lifted from its seat, with the vanes still engaged with the mirrored hollow vanes forming the labyrinth.

The labyrinthine vaned poppet and mirrored labyrinthine seat may allow the powder to escape through the labyrinthine arrangement clearance disposed radially about the poppet, while effectively trapping the microwave energy within the resonant cavity. Thus, the exit lens of the direct gas producing magnetron is formed so as to promote mixing of gas and charged powder via a helical arrangement similar to a hollow screw thread. This helical chamber is constructed to the dimensions necessary to act as resonant cavity of proper volume to minimize VSWR. Charged powder acts to transfer heat directly to highly atomized gas from the high pressure atomizing nozzle, including the option of piezoelectric ultrasonic dispersion of working vapor. The powder runs in an endless cycle from reservoir to lens and back. The powder is directed out of the produced gas stream via electromagnetic field and the labyrinthine poppet, which is opaque to microwave energy while, at the same time, passes both superheated working gas and powder back to the reservoir.

It should be understood that the gasifier tubes are part of a segregated heat exchange system, with the microwave energy generated by the magnetron being propagated through a matching network and the permanently permeable matrix, working inside a resonant cavity, which heats and maintains a flowing bath of salt to a molten condition. The molten salt fills the heat exchanger, surrounds the gasifier tubes, and provides the thermal energy for the Rankine phase change operation, simultaneously providing heated electrolyte for a liquid sodium battery, used in a feedback or bootstrap loop with the anode of the magnetron.

Figure 5:
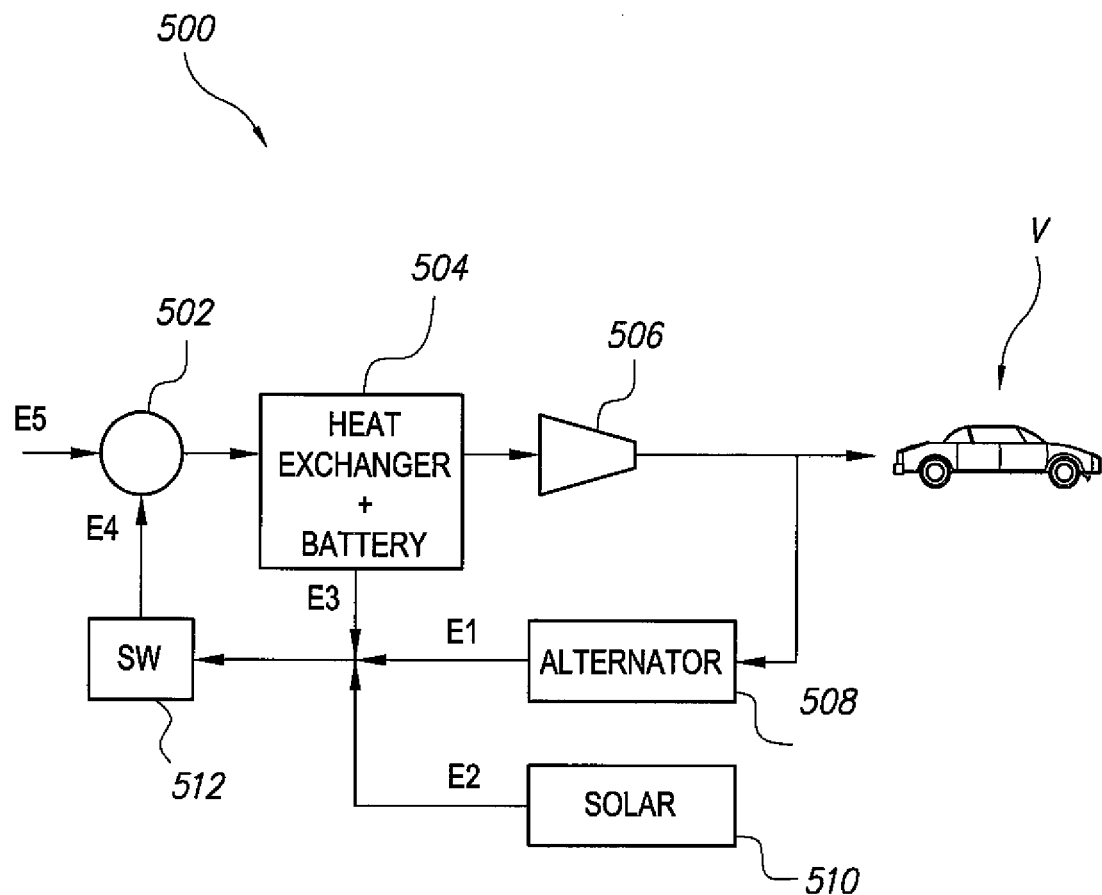
FIG. 5 is a diagrammatic overview of an alternative embodiment of the Rankine engine with the efficient heat exchange system.

FIG. 5 diagrammatically illustrates an alternative vehicular drive system 500. External power (EP) is supplied to magnetron 502. The external power source may be any suitable source of electrical energy, such as, for example, a conventional AC source. As described in the previous embodiments, the magnetron 502 generates microwave energy to increase the temperature of the slurry used within the heat exchanger 504. During the runtime of the vehicle V, the heat exchanger 504 provides heat to an expander 506 to keep the Rankine engine working. Therefore, keeping the temperature of the heat exchanger 504 within a fixed range is necessary to keep the vehicle V running. The function of magnetron 502 during the runtime is to stop decrease of temperature in the heat exchanger 504. As shown, the magnetron 502 has three input sources: E1, E2 and E3. A switch mode power supply system (SW) 512 converts DC input E1, E2, E3 to three-phase AC power, which is used to drive magnetron 502. When the temperature of heat exchanger 504 decreases to a minimum temperature, the vehicle V must stop to re-charge (i.e., input EP to magnetron 502).

Preferably, one or more solar panels 510 are provided on vehicle V for providing additional energy output E2. Heat exchanger 504 produces energy output E3, and an alternator, which is preferably coupled to expander 506, generates energy output E1. Electrical energy drawn from the alternator 508, the solar panel 510 and the heat exchanger battery 504 is input to the magnetron 502 (through switch mode power supply system 512) to generate microwave energy, which is directed to the slurry of the heat exchanger 504. The overall energy input to the magnetron 502 may be represented as E4. As in the previous embodiment, the slurry may be molten salt or the like. With regard to the solar panel(s) 510, any suitable number or type of solar panels may be utilized. The efficiency of the solar panel(s) may be augmented by solar tracking systems, focusing lenses, scanning or tracking solar concentrators or the like, as is well known. One such solar concentrator may be in the form of, for example, compounded mirrors mounted on a drum, with the drum being controllably rotated to selectively reflect light onto the solar panels, tracking movement of the sun and maximizing impingement of the reflected radiation onto the solar panels.

Alternately, a cathode of the magnetron 502 may receive power E1 from alternator 508, and the anode may receive power E2 and E3 through SW 512. The magnetron 502 plays a very important role in the system, and the alternator 508 can improve the performance of the system as well. In order to calculate the size of the magnetron 502 for purposes of efficiency, the ultimate size is determined by the mass of the molten salt (used as an exemplary slurry), running time and the heat exchange efficiency. The size typically will be approximately between 26 kW and 130 kW (for the anode). The magnetron 502 has an efficiency of approximately 92% for L band microwave emissions.

The alternator 508 has an efficiency of approximately 60%, drawing between zero and approximately 50 hp from the vehicle V. The SW has an efficiency of approximately 90%. For purposes of calculation, the heat exchanger battery (which is preferably formed integral with heat exchanger 504, storing power generated thereby as electrical power, released as energy E3) is assumed to be formed as a 13 cm. bipolar battery, with a Li—Al/$FeS_2$ electrode and a LiCl—KCl electrolyte. The exemplary battery has an output potential of 36 V (formed from twenty individual cells), a reversibility of 100% and an operating temperature of up to 787.78° C.

Figure 6:
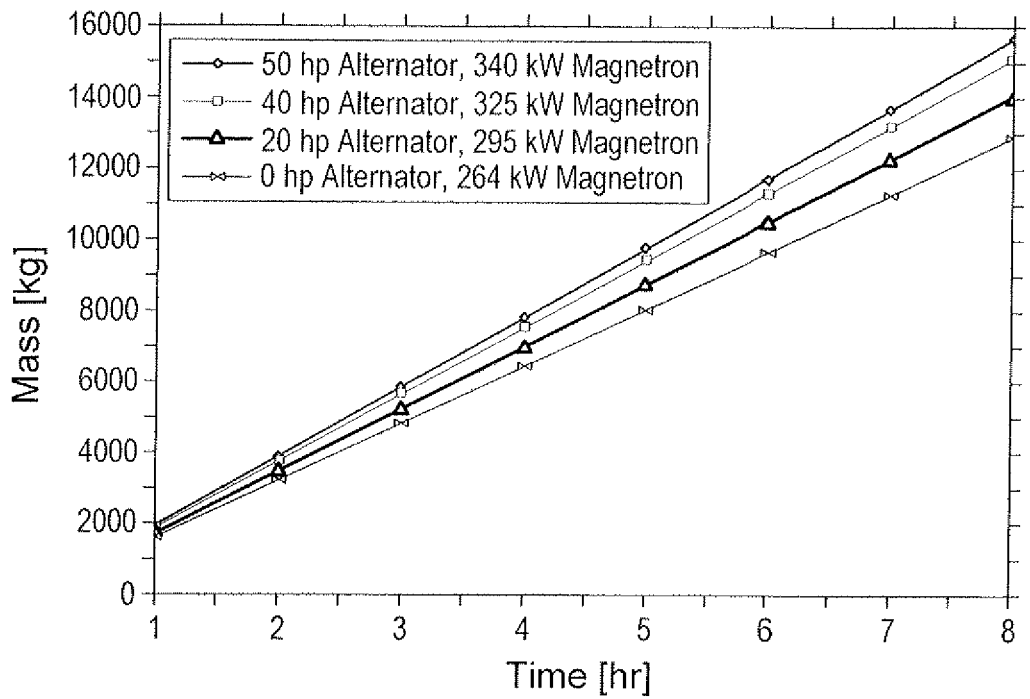
FIG. 6 is a graph plotting mass of a slurry used in the Rankine engine with efficient heat exchange system of FIG. 5 against engine run time for differing alternators and magnetrons used therewith at a heat exchanger battery efficiency of 1.5.

Using these specifications, the mass of molten salt used as a slurry is modeled as a function of runtime for four differing values of combinations of alternators and magnetrons in FIG. 6. In FIG. 6, the efficiency of the heat exchanger battery is set to a value of 1.5, where the efficiency is determined as a ratio of the sum of energy output of the heat exchanger to expander 506 and energy output of the battery (E3) to energy input to the heat exchanger (from magnetron 502).

Figure 7:
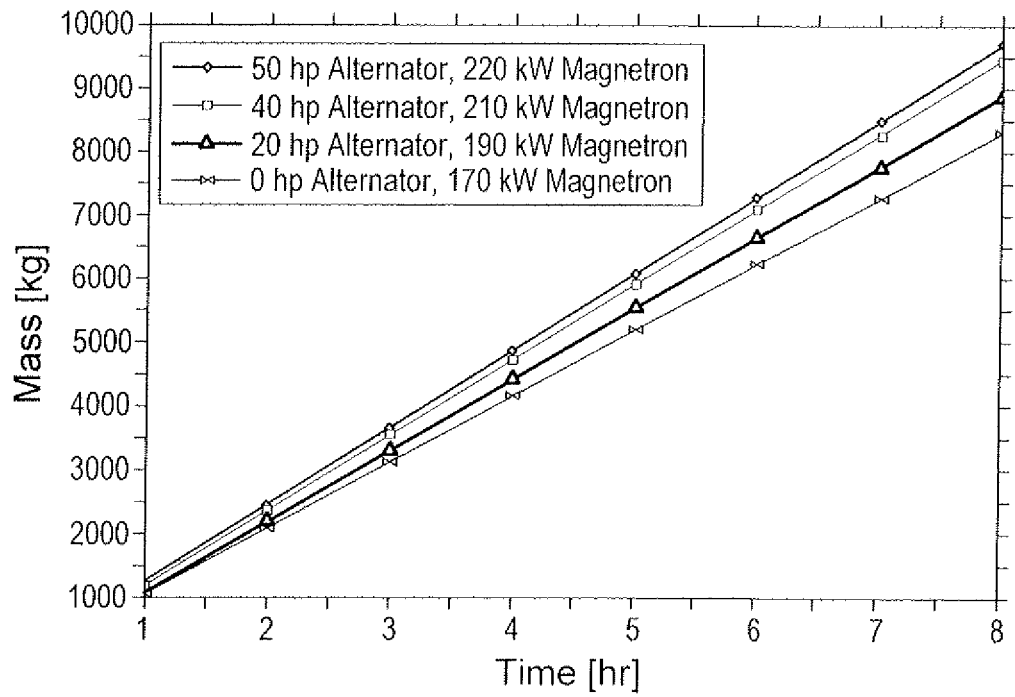
FIG. 7 is a graph plotting mass of a slurry used in the Rankine engine with the efficient heat exchange system of FIG. 5 against engine run time for differing alternators and magnetrons used therewith at a heat exchanger battery efficiency of 2.0.
Figure 8:
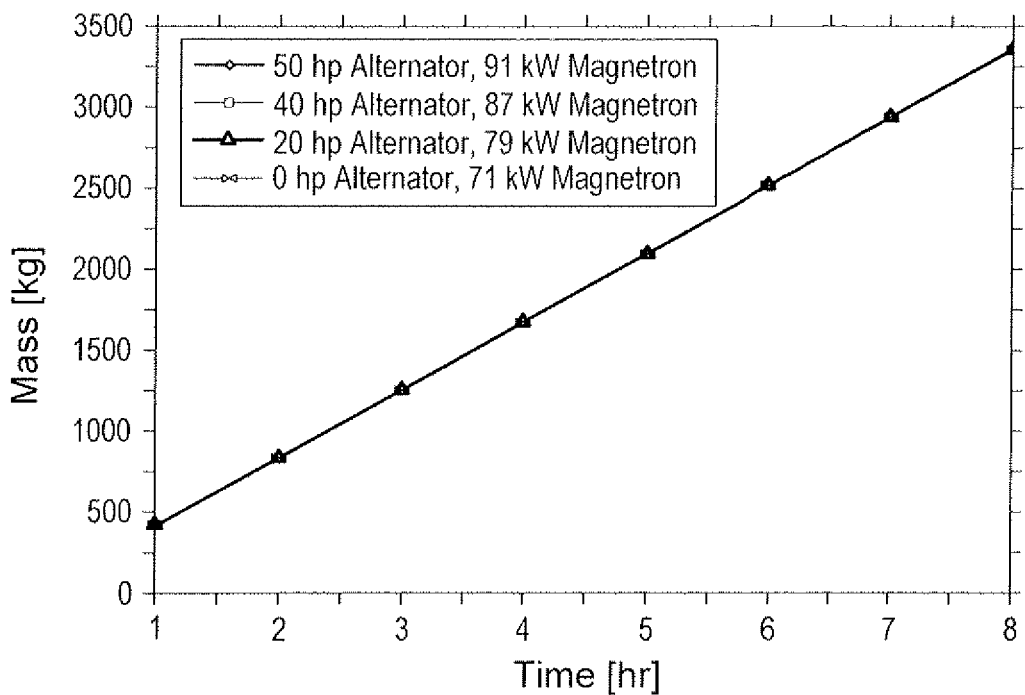
FIG. 8 is a graph plotting mass of a slurry used in the Rankine engine with the efficient heat exchange system of FIG. 5 against engine run time for differing alternators and magnetrons used therewith at a heat exchanger battery efficiency of 4.0.

FIG. 6 shows that a relatively large amount of molten salt is required to prolong the running time of the engine. Thousands of kilograms of salt would be required, which is impractical for real world purposes. It should be noted that as alternator size decreases, the amount of required salt (and size of the magnetron) decreases. FIG. 7 illustrates the same conditions, but with a heat exchanger battery efficiency of 2.0. The results are relatively similar, though the mass of required salt has been approximately halved. FIG. 8 illustrates the same conditions with a heat exchanger battery efficiency of 4.0. The alternator is found to have little effect on overall performance, but the trend of decreasing magnetron size and salt mass continues from FIG. 7.

Figure 9:
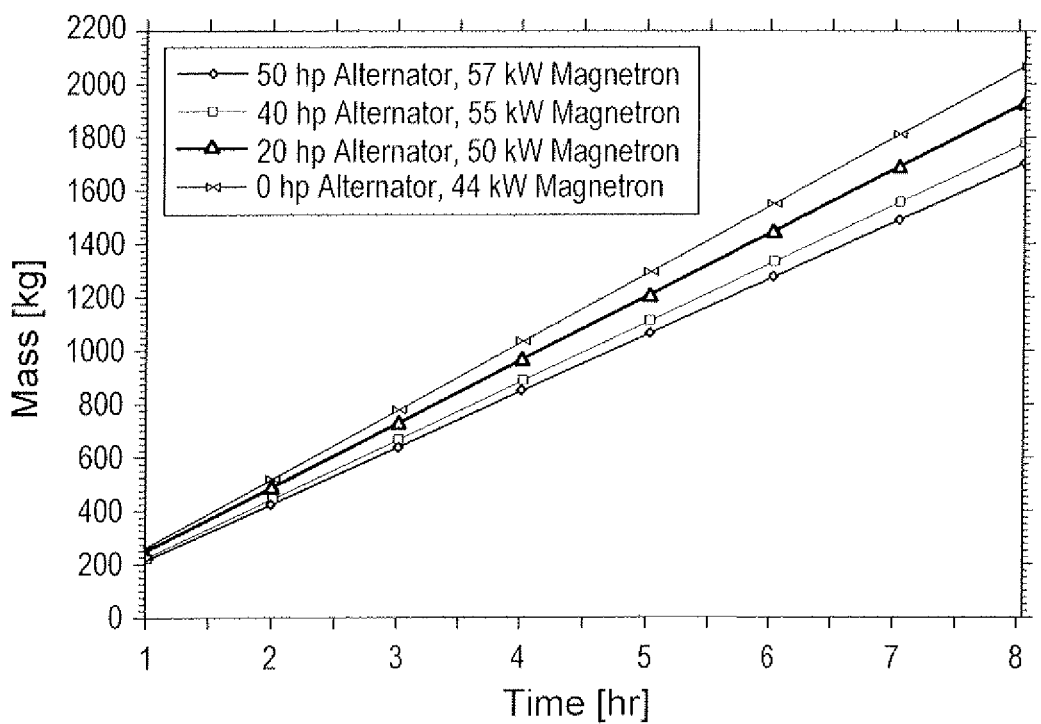
FIG. 9 is a graph plotting mass of a slurry used in the Rankine engine with the efficient heat exchange system of FIG. 5 against engine run time for differing alternators and magnetrons used therewith at a heat exchanger battery efficiency of 6.0.
Figure 10:
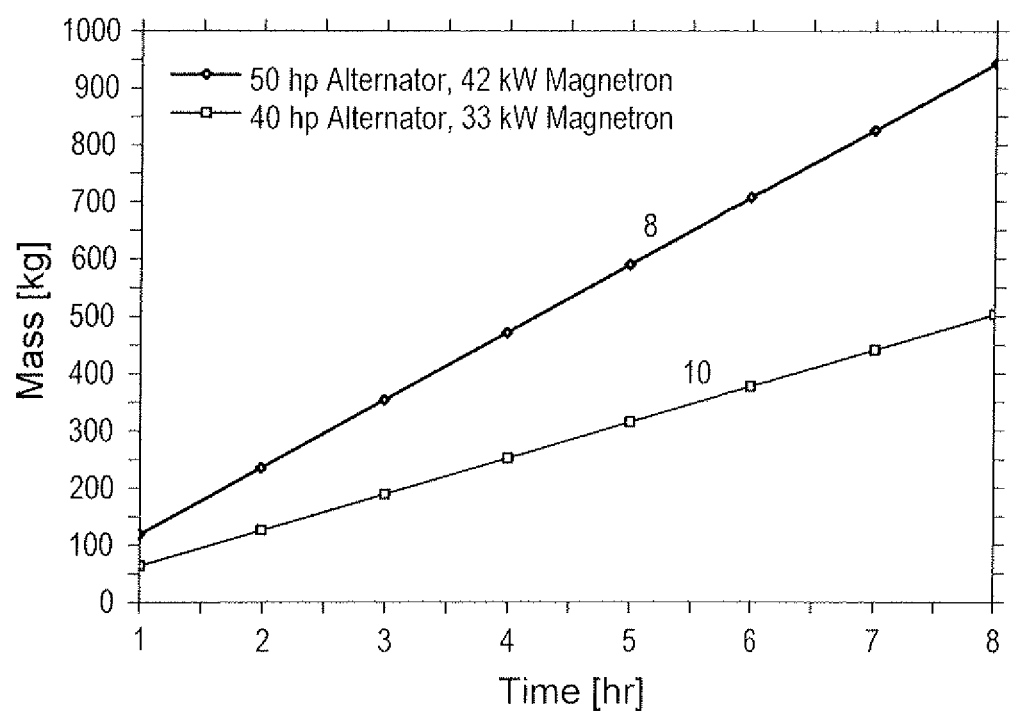
FIG. 10 is a graph plotting mass of a slurry used in the Rankine engine with the efficient heat exchange system of FIG. 5 against engine run time for heat exchanger battery efficiencies of 8.0 and 10.0.

FIG. 9 illustrates the required mass of salt for a heat exchanger battery efficiency of 6.0. In this case, the alternator has a negative effect when compared with the previous results; i.e., the larger the selected alternator, the less salt is required. FIG. 10 illustrates efficiencies of both 8.0 and 10.0 for the heat exchanger. Only a single 50 hp alternator is shown in FIG. 10. The amount of salt required and the magnetron size both continue to decrease as the efficiency value increases. In FIG. 10, the required volume of molten salt drops to within reasonable limits. Thus, if the efficiency of the heat exchanger battery is 6.0 or greater, only approximately 200-600 kg of molten salt (approximately 60-200 gallons) are needed for the engine to run for between approximately three and four hours.

It should be understood that the magnetron is initially charged by external power EP, which may come from a conventional power grid. The overall system only switches over to the heat exchange/Rankine/solar powered system as the vehicle is operated. The system may also be used for power grid energy storage, rather than vehicle drive. In such usage, the magnetron input may be the same as the engine initial charge-up (from power grid energy), storing excess grid capacity for when it is most needed, or alternative energy inputs may also be used, such as wind, solar, geothermal, etc. Output is the same Rankine engine, however used for driving a stationary generator rather than a vehicle. It should be understood that any form of conventional electrical power generation equipment can be driven from the Rankine output and that the engine is not solely designed for vehicular usage.

When molten salt is used as the slurry material, the electrolyte used in the heat exchanger battery may in the form of liquid sodium. The battery essentially operates through thermalizing and maintaining elevated temperature within the molten salt electrolyte (up to 787.78° C.), using the magnetron as the source of thermal energy through the medium of the PPM in the resonant cavity domain. The magnetron anode bleeds off only a small percentage of battery output to power its anode (approximately 13 KV at 2 A for a 15 KW magnetron and up to 18 KV at 10 A for a 100 KW magnetron).

Although liquid sodium electrolyte batteries are known, the present heat exchanger battery utilizes the absorption of the microwave energy generated by the magnetron by the PPM to heat the salt to become molten. The PPM may be formed as plate separators of boron nitride ceramic or the like, which may be further mixed with additional powdered constituents, such as silicon carbide, nickel, tungsten or the like. The molten salt electrolyte may be stored or pumped through these porous sintered plates, simultaneously acting as the dielectric plate separators and as the agent of propagation of the microwave energy, which thermalizes the electrolyte. Thus, using the principle of Gibbs free energy, the molten salt electrolyte returns energy to the magnetron perpetuating the thermo electric process and thereby substantially increase the efficiency of storing energy.

It should be understood that the sintered materials described above may be used for alternative purposes, such as, for example, in the construction of superconducting alternators. The sintered metals, particularly in combination with ceramic powders, could be used to create superconductive helices, used in the coils of an alternator, for example. As noted above, the porous interiors of the sintered elements allow for the transfer of coolant therethrough, thus providing coolant for the superconductive coils.

Running a relatively large alternator (such as a 1,000 A alternator, for example) is relatively straightforward from the viewpoint of the aerodynamics and pressure differential caused by 60 MPH movement of a massive non-streamlined object, such as a semi-trailer. The pressure differential between the forward impact high pressure air and low pressure or suction air from beneath the vehicle is utilized; i.e., the so-called "ground effect". This is a large suction force created below the vehicle, which is caused by moving a half-Venturi tunnel along the ground within a certain distance of it, depending on how much drag is tolerable. Thousands of pounds of downforce can be created by simple relative motion between the Venturi tunnel and the road. The downforce component is not significant in terms of its relationship, percentage wise, to total GVW.

It should be understood that sustainability of the system is of primary concern. The ultimate objective is running at least a 15 KW magnetron full time, with continual reheating of the slurry pumping in an endless cycle through the resonant cavity. If the expander insulation creates an adiabatic environment, and there is no cooling system involved (and no exhaust to atmosphere; i.e., a closed loop), then the primary entropy formation is only due to the transition and expansion of gas, which can be largely alleviated by selective geometry of the expanding volume the gas is pumped into. In the above devolving multi-chamber design, the gas chamber volume remains essentially constant as expansion occurs; i.e., work is performed without the much simpler geometry of pistons moving in cylinders (exponential volume increase).

In the above embodiments, the efficiency of the magnetron may be increased by replacing the conventional copper monolithic anode of a conventional magnetron with a sintered anode. The sintered anode remains porous internally, post-sintering, yet is fluid tight externally (which is necessary for positioning within the resonant cavity). In order to form the sintered anode, various gradients of powdered metal are used in the formation die, with the small gradient (i.e., the densest powder) being used on the entire periphery of the sintered anode, and with larger diameter/gradient powder being used internally. Thus, the sintered anode is shaped precisely as the copper anode, but is internally porous and can be manifolded and sectioned so as to directionally flow a liquid nitrogen coolant, for example, throughout the entire sintered anode, effectively removing heat at a much higher rate than heat rejection to water in the conventional solid copper-water cooled anodic configuration.

A closed loop cryo-chilling system or the like may he used to pump the liquid nitrogen, liquid argon or other suitable coolants throughout the entire sintered anode, with directional flow being established by means of solids introduced into the die at sintering, or via the denser powder methodology. Flow may be circular, helical, or sinusoidal, passing up and down around each individual resonant cavity.

The powder to be used in the sintering of the anode may be copper, nickel, a nickel-chromium alloy (such as Inconel®), Hastelloy®, tungsten powder, combinations thereof or the like. The metallic powder may further be mixed with a ceramic powder. Any suitable type of coolant and chiller may be utilized. Further, the sintered anode may also be used to direct the electromagnetic energy from the magnetron to the gasifier tubes.

In the previous embodiments, the gasifier tubes are part of a segregated heat exchange system, with the microwave energy being propagated through a matching network and the permanently permeable matrix, working inside a resonant cavity, which heats and maintains a flowing bath of salt to a molten condition. The molten salt fills the heat exchanger, surrounds the gasifier tubes, and provides the thermal energy for the Rankine phase change operation, simultaneously providing heated electrolyte for a liquid sodium battery, used in a feedback or bootstrap loop with the anode of the magnetron. As an alternative, the PPM may breach the walls of the gasifier tubes, allowing EM energy propagation along porous powdered metal trails into the interiors of the gasifier tubes. The small gradient powder may be brazed to form nickel foam or the like of extreme high porosity. If the gasifier tubes are constructed from ceramics/dielectrics, the EM energy in the cavity can permeate the functionally capacitive walls of the gasifier tubes, and along with energy propagating through the sintered porous powdered metal trails, may also heat the atomized working fluid.

The increased surface area of the powdered anode increases thermal transfer from the anode when the coolant is pumped through the porous portion of the anode. In the embodiment of FIG. 5, which includes expander 506, the coolant may be pumped through the anode of the cavity magnetron first, prior to injection into the gasifier tubes, where it is then superheated and used to perform Rankine expansion, prior to being condensed, compressed, and returned again to cryo-condition, in a heat exchange operation, thus increasing Carnot efficiency of device.

Further, as noted above, the Rankine engine with the efficient heat exchange system may be used in combination with the conventional power grid and/or with alternative sources of power, such as solar panels, wind turbines and the like. In conventional low pressure turbines, low pressure fluid is ducted to the "scavenge" sides of the turbine blades, with high pressure fluid ducted to the "pressure" sides of the blades. This typically takes place through segmented stator sections. However, the present system acts as an additional thermal source (in the form of the molten salt slurry). Thus, a heated air intake for a turbine may be positioned to always face the wind, with a low drag heat exchanger of the type described above being used to heat the wind on its way to the turbine, thus increasing energy input of the turbine through the pre-heating of the wind. This may be used in conjunction with the co-joined integral Venturi section described above, which follows the air intake direction. This provides a convenient position and configuration for extracting the scavenged blade fluid (i.e., low pressure).

It is to be understood that the present invention is not limited to the embodiments described above, but encompasses any and all embodiments within the scope of the following claims.

I claim:

1. An efficient heat exchange system for storing energy, comprising:
   an energy storage heat exchanger, the heat exchanger including permeable powdered material disposed therein, wherein the permeable powdered material is selected from the group of materials consisting of a permeable powdered metal and a permeable powdered metal—ceramic, the energy storage heat exchanger including an electrical storage battery, wherein the electrical storage battery includes at least one electrical energy producing cell;
   an electromagnetic energy source proximate the energy storage heat exchanger, wherein the electromagnetic energy source is coupled to the electrical storage battery;
   a waveguide network coupled to the electromagnetic energy source;
   a high operating temperature slurry adapted for heating under electromagnetic energy exposure, the high operating temperature slurry comprises a molten salt electrolyte, wherein the waveguide network selectively directs energy from the electromagnetic energy source to the slurry so as to heat the electrolyte to approximately 787° C., the permeable powdered material being positioned coincident to the high operating temperature slurry, such that the permeable powdered material accelerates the heating of the high operating temperature slurry when the electromagnetic energy is applied thereto, wherein the molten salt electrolyte constitutes the electrolyte for the at least one cell of the electrical storage battery and adapted to feed back the electrical output to the electromagnetic energy source to thereby increase efficiency and storage of energy;

means for circulating the slurry in a closed loop within the heat exchanger;

means for circulating a working fluid through the heat exchanger to transfer thermal energy from the slurry to the working fluid in order to effect phase change of the working fluid from a liquid to a high pressure gas; and means for directing the high pressure gas to an inlet of an engine in order to operate the engine.

2. The efficient heat exchange system for storing energy as recited in claim 1, wherein said electromagnetic energy source comprises a magnetron for generating microwave energy.

3. The efficient heat exchange system for storing energy as recited in claim 2, wherein said means for circulating the working fluid through the heat exchanger comprises a fluid pump.

4. The efficient heat exchange system for storing energy as recited in claim 3, further comprising: a plurality of gasifier tubes for receiving the working fluid in its liquid phase and for outputting the high pressure gas.

5. The efficient heat exchange system for storing energy as recited in claim 4, further comprising at least one atomizer disposed within each said gasifier for atomizing the working liquid in its liquid phase upon input to the gasifier.

6. The efficient heat exchange system for storing energy as recited in claim 5, further comprising a resonant cavity formed about said heat exchanger, said resonant cavity having a plurality of labyrinth traps defining a labyrinthine flow path for increased thermal exposure, wherein said slurry is co-located within said resonant cavity.

7. The efficient heat exchange system for storing energy as recited in claim 5, wherein said engine for generating electricity comprises:

a vapor phase change engine having an expander connected to an electrical power supply, said expander being in thermal communication with said energy storage heat exchanger, said expander selectively releasing stored thermal energy in said slurry; and a driven alternator in order to generate electrical energy, said alternator being coupled to said electromagnetic energy source.

8. The efficient heat exchange system for storing energy as recited in claim 7, further comprising a switch mode power supply system, wherein said alternator and said electrical storage battery are electrically coupled to said magnetron through said switch mode power supply system.

9. The efficient heat exchange system for storing energy as recited in claim 8, further comprising at least one solar panel electrically coupled to said magnetron through said switch mode power supply system.

10. The efficient heat exchange system for storing energy as recited in claim 2, wherein an anode of the magnetron is sintered.

11. The efficient heat exchange system for storing energy as recited in claim 2, wherein said magnetron is tuned to generate the microwave energy having a voltage standing wave ratio of approximately 1:1 with respect to the permeable powdered material.

12. The efficient heat exchange system for storing energy as recited in claim 1, wherein said molten salt electrolyte producing Gibbs free energy through reaction with said at least one electrical storage battery and returning Gibbs free energy to said electromagnetic energy source to thereby enhance thermoelectric conversion and increase efficiency and storage of energy.

13. The efficient heat exchange system for storing energy as recited in claim 1, wherein the permeable powdered material comprises a porous powdered super alloy having a first gradient size sandwiched between layers of a porous super alloy foam matrix material having a second gradient size, said second gradient size being greater than said first gradient size.

14. The efficient heat exchanger system for storing energy as recited in claim 1, further comprising a solar power source for providing power to said electromagnetic energy source.

15. An efficient heat exchange system for storing energy, comprising:

an energy storage heat exchanger having a permeable powdered metal and ceramic matrix disposed therein, the energy storage heat exchanger including an electrical storage battery, wherein the battery includes at least one electrical energy producing cell;

an energy source proximate the energy storage heat exchanger, wherein the energy source is coupled to the electrical storage battery;

a high operating temperature slurry adapted for heating under exposure to the energy source, the high operating temperature slurry comprises a molten salt electrolyte, wherein the energy source heats the electrolyte to approximately 787° C., the permeable powdered metal and ceramic matrix being positioned coincident to the high operating temperature slurry, such that the permeable powdered metal and ceramic matrix accelerates the heating of the high operating temperature slurry when the energy source is applied thereto; and means for circulating the slurry in a closed loop within the heat exchanger.

* * * * *